US012693682B2

(12) United States Patent
Shim et al.

(10) Patent No.: US 12,693,682 B2
(45) Date of Patent: Jul. 28, 2026

(54) METHOD AND APPARATUS FOR INTERWORKING BETWEEN AUTONOMOUS DRIVING DELIVERY ROBOT AND TRANSPORTATION INFRASTRUCTURE

(71) Applicant: ELECTRONICS AND TELECOMMUNICATIONS RESEARCH INSTITUTE, Daejeon (KR)

(72) Inventors: Taehyoung Shim, Sejong-si (KR); Jun Seob Lee, Daejeon (KR); Jeongil Yim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 52 days.

(21) Appl. No.: 18/764,539

(22) Filed: Jul. 5, 2024

(65) Prior Publication Data
US 2025/0076895 A1 Mar. 6, 2025

(30) Foreign Application Priority Data

Aug. 30, 2023 (KR) ........................ 10-2023-0114118
Apr. 24, 2024 (KR) ........................ 10-2024-0054545

(51) Int. Cl.
*G05D 1/656* (2024.01)
*B25J 11/00* (2006.01)
(Continued)

(52) U.S. Cl.
CPC ............ *G05D 1/656* (2024.01); *B25J 11/008* (2013.01); *G05D 2105/20* (2024.01); *G05D 2107/60* (2024.01)

(58) Field of Classification Search
CPC .............. G05D 1/656; G05D 2105/20; G05D 2107/60; B25J 11/008; G06Q 10/047;
(Continued)

(56) References Cited

U.S. PATENT DOCUMENTS

| 10,192,113 B1 * | 1/2019 | Liu ...................... G06V 10/147 |
| 2004/0226775 A1 * | 11/2004 | Takatama ............... G06Q 30/06 |
(Continued)

FOREIGN PATENT DOCUMENTS

| JP | 2004338888 A | * 12/2004 |
| KR | 10-2022-0032857 A | 3/2022 |
| KR | 10-2023-0100325 A | 7/2023 |

OTHER PUBLICATIONS

Taehyoung Shim et al., "Y.DRI-reqts: Propose editorial modification for Determination", International Telecommunication Union, SG20-Cn, Sep. 13-22, 2023.

*Primary Examiner* — Ellis B. Ramirez
(74) *Attorney, Agent, or Firm* — LRK PATENT LAW FIRM

(57) ABSTRACT

A method and apparatus for interworking between an autonomous delivery robot and a transportation infrastructure are disclosed. A method of operating a delivery robot service provider that manages a delivery robot, the method may include: generating delivery information in response to a delivery request from a user; assigning a delivery robot that is to perform the delivery request; transmitting the delivery information to the delivery robot; checking whether the delivery robot arrives at a transportation infrastructure located on a delivery route based on delivery status information transmitted from the delivery robot; and transmitting signal request information associated with the transportation infrastructure to a traffic information service provider that (Continued)

manages the transportation infrastructure to allow the delivery robot to use the transportation infrastructure.

10 Claims, 11 Drawing Sheets

(51) Int. Cl.
*G05D 105/20* (2024.01)
*G05D 107/60* (2024.01)

(58) Field of Classification Search
CPC .... G06Q 10/063; G06Q 10/08; G06Q 30/018; G06Q 30/0601; G06Q 50/40; G08G 1/202
USPC ........ 700/245, 248; 709/208, 211, 201, 202; 705/7.21, 7.12, 28; 901/1
See application file for complete search history.

(56) References Cited

U.S. PATENT DOCUMENTS

| | | | |
|---|---|---|---|
| 2015/0350254 A1* | 12/2015 | Hendrick | ................. H04L 63/20 |
| 2019/0206236 A1* | 7/2019 | Tao | ........................... G08G 1/08 |
| 2020/0242924 A1* | 7/2020 | Publicover | ............. G08G 1/087 |
| 2021/0256465 A1* | 8/2021 | Väin | ................ G06Q 10/08355 |
| 2022/0036310 A1* | 2/2022 | Heinla | .................... G06Q 10/08 |
| 2022/0253059 A1* | 8/2022 | Pandey | ............... G05D 1/0274 |
| 2023/0094093 A1* | 3/2023 | Cha | ................ B60W 60/00253 |
| 2023/0094987 A1 | 3/2023 | Cha | |

\* cited by examiner

1600

Communication
module
1660

Processor
1620

Memory
1640

1700

Communication
module
1760

Processor
1720

Memory
1740

METHOD AND APPARATUS FOR INTERWORKING BETWEEN AUTONOMOUS DRIVING DELIVERY ROBOT AND TRANSPORTATION INFRASTRUCTURE

CROSS-REFERENCE TO RELATED APPLICATIONS

This application claims the benefit under 35 USC § 119(a) of Korean Patent Application No. 10-2023-0114118 filed on Aug. 30, 2023, and Korean Patent Application No. 10-2024-0054545 filed on Apr. 24, 2024, in the Korean Intellectual Property Office, the entire disclosures of which are incorporated herein by reference for all purposes.

BACKGROUND

1. Field of the Invention

The following description relates to a method and apparatus for interworking between an autonomous driving delivery robot and a transportation infrastructure.

2. Description of Related Art

An autonomous delivery robot service may refer to a service in which a delivery robot delivers goods by interworking with urban infrastructures and other entities.

The autonomous delivery robot service may require an interworking protocol between entities (e.g., a delivery robot, a service provider, a user, and an infrastructure).

The above description is information the inventor(s) acquired during the course of conceiving the present disclosure, or already possessed at the time, and is not necessarily art publicly known before the present application was filed.

SUMMARY

An aspect may provide an interworking method for an autonomous delivery robot-based delivery service.

However, technical challenges or objects are not limited to those described above, and other technical challenges or objects may exist.

According to an example embodiment, there is provided a method of operating a delivery robot service provider that manages a delivery robot, the method including: generating delivery information in response to a delivery request from a user; assigning a delivery robot that is to perform the delivery request; transmitting the delivery information to the delivery robot; checking whether the delivery robot arrives at a transportation infrastructure located on a delivery route based on delivery status information transmitted from the delivery robot; and transmitting signal request information associated with the transportation infrastructure to a traffic information service provider that manages the transportation infrastructure to allow the delivery robot to use the transportation infrastructure.

The delivery information may include information about the transportation infrastructure that needs to be interworked with the delivery robot.

The delivery status information may include information to notify the delivery robot service provider that the delivery robot is waiting to use the transportation infrastructure.

The method may further include receiving, from the traffic information service provider, signal status information associated with the transportation infrastructure, which is generated according to the signal request information.

The method may further include transmitting, to the delivery robot, the signal status information to allow the delivery robot to cross a road using the transportation infrastructure.

The method may further include determining whether a signal change in the transportation infrastructure is required, based on the signal status information; in response to a determination that the signal change is required, generating signal change request information for the signal change in the transportation infrastructure; and transmitting the signal change request information to the traffic information management system.

According to an example embodiment, there is provided a delivery robot service providing device configured to manage a delivery robot, the delivery robot service providing device including: a processor; and a memory storing instructions. When executed by the processor, the instructions may cause the delivery robot to perform a plurality of operations, and the plurality of operations may include: generating delivery information in response to a delivery request from a user; assigning a delivery robot that is to perform the delivery request; transmitting the delivery information to the delivery robot; checking whether the delivery robot arrives at a transportation infrastructure located on a delivery route based on delivery status information transmitted from the delivery robot; and transmitting signal request information associated with the transportation infrastructure to a traffic information service provider that manages the transportation infrastructure to allow the delivery robot to use the transportation infrastructure.

The delivery information may include information about the transportation infrastructure that needs to be interworked with the delivery robot.

The delivery status information may include information to notify the delivery robot service provider that the delivery robot is waiting to use the transportation infrastructure.

The plurality of operations may further include receiving, from the traffic information service provider, signal status information associated with the transportation infrastructure, which is generated according to the signal request information.

The plurality of operations may further include transmitting, to the delivery robot, the signal status information to allow the delivery robot to cross a road using the transportation infrastructure.

The plurality of operations may further include determining whether a signal change in the transportation infrastructure is required, based on the signal status information; in response to a determination that the signal change is required, generating signal change request information for the signal change in the transportation infrastructure; and transmitting the signal change request information to the traffic information management system.

According to an example embodiment, there is provided a method of operating a delivery robot, the method including: receiving delivery information in response to a delivery request from a user; traveling along a delivery route based on the delivery information; upon arriving at a transportation infrastructure on the delivery route, generating delivery status information to use the transportation infrastructure; and transmitting the delivery status information to a delivery robot service provider to notify the delivery robot service provider that the delivery robot is waiting to use the transportation infrastructure.

The delivery robot service provider may be configured to transmit signal request information associated with the transportation infrastructure to a traffic information service provider that manages the transportation infrastructure based on the delivery status information, to allow the delivery robot to use the transportation infrastructure.

The delivery information may include information about the transportation infrastructure that needs to be interworked with the delivery robot.

The method may further include receiving, from the traffic information service provider, signal status information associated with the transportation infrastructure generated according to the signal request information.

The method may further include crossing a road using the transportation infrastructure based on the signal status information.

DETAILED DESCRIPTION

Figure 1:
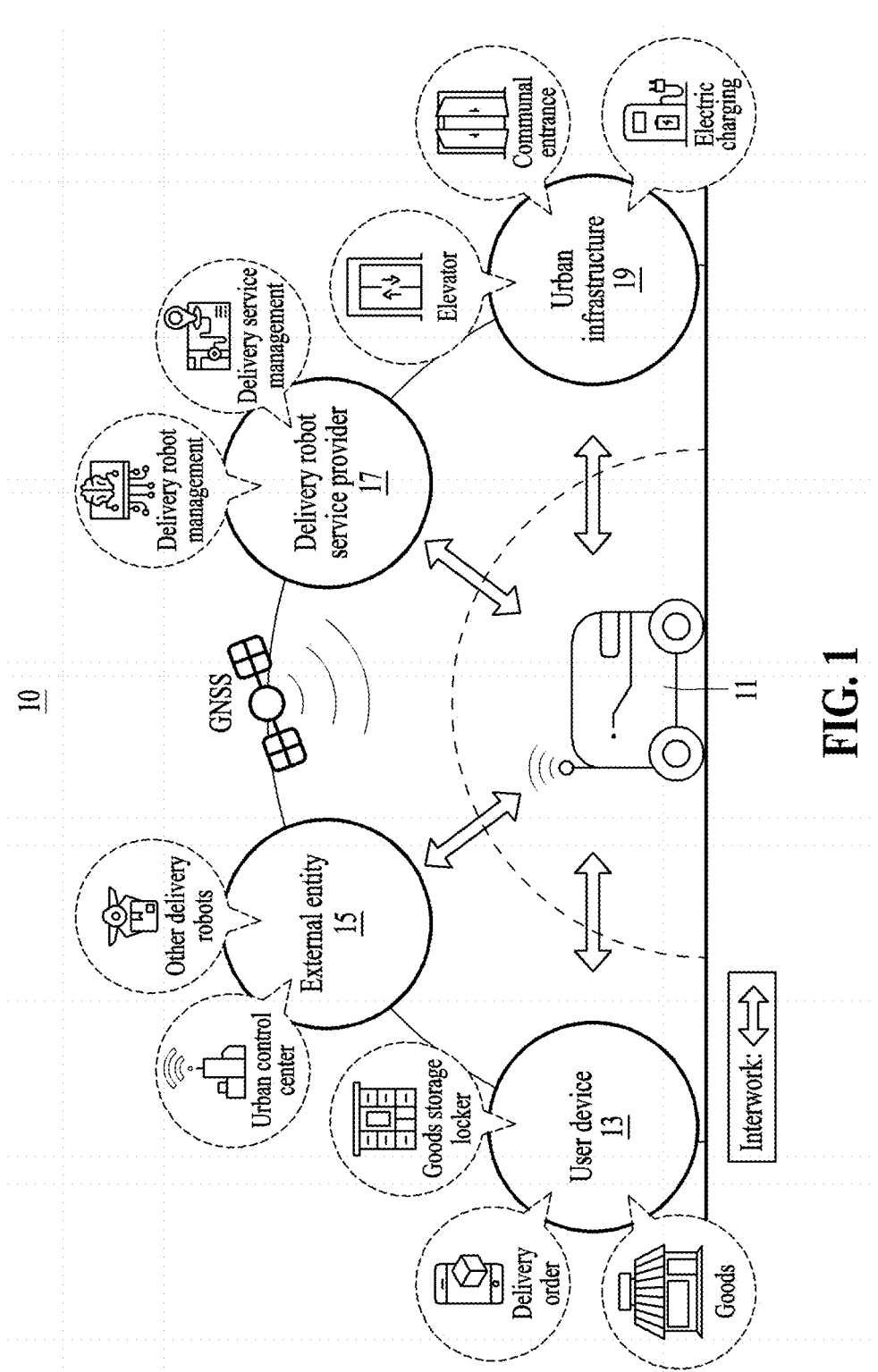
FIGS. 1 and 2 are diagrams illustrating a delivery robot service system according to an example embodiment.

The following structural or functional descriptions of example embodiments are merely intended for the purpose of describing the example embodiments, and the example embodiments may be implemented in various forms. The example embodiments are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component, or intervening components may be present.

As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

As used herein, the term "unit" (or "-er/or") refers to software or hardware components such as a field-programmable gate array (FPGA) or an ASIC, and the unit may perform some functions. However, the unit is not limited to software or hardware. The unit may be configured to be on an addressable storage medium or may be configured to operate one or more processors. For example, the unit may include components, such as, software components, object-oriented software components, class components, and task components, processes, functions, attributes, procedures, subroutines, segments of program code, drivers, firmware, microcode, circuits, data, databases (DBs), data structures, tables, arrays, and variables. The functionality provided within components and units may be combined into fewer components and units or further separated into additional components and units. Further, the components and units may be implemented to operate one or more central processing units (CPUs) in a device or security multimedia card. Furthermore, the unit or -er/or may include one or more processors.

Hereinafter, example embodiments will be described in detail with reference to the accompanying drawings. When describing the example embodiments with reference to the accompanying drawings, like reference numerals refer to like components and a repeated description related thereto is omitted.

The following embodiments will be described using a delivery robot for ease of description but may also apply to any mobile robot capable of autonomous driving and/or remote control, and thus the embodiments are not limited to the delivery robot.

Figure 2:
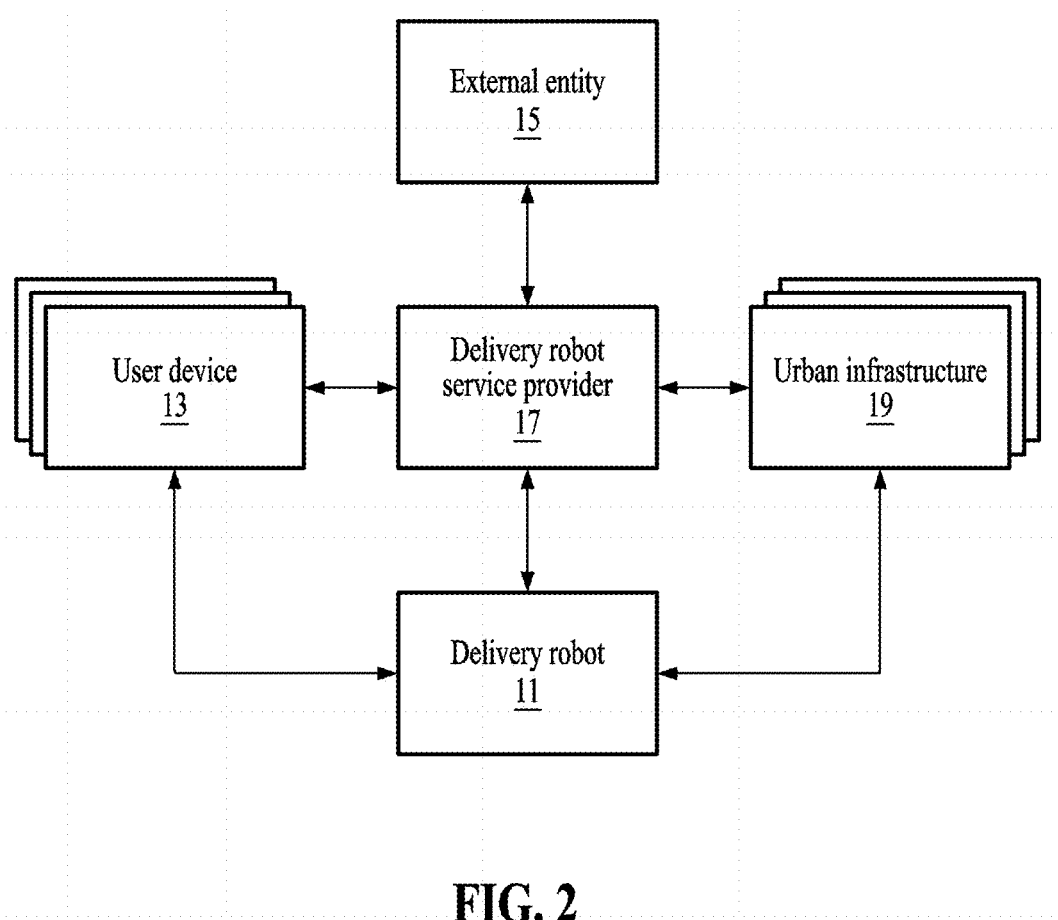

FIGS. 1 and 2 are diagrams illustrating a delivery robot service system according to an example embodiment.

Referring to FIGS. 1 and 2, according to an example embodiment, a delivery robot service system 10 may include a delivery robot 11, a user device 13, an external entity 15, a delivery robot service provider 17, and urban infrastructure 19.

The delivery robot 11 may deliver goods based on a delivery request from a user. The delivery robot 11 may include an autonomous driving-based robot. The delivery robot 11 may directly interwork with the user device 13, the delivery robot service provider 17, and the urban infrastructure 19. The delivery robot 11 may indirectly interwork with the external entity 15 through the delivery robot service provider 17.

The delivery robot 11 may share information (e.g., identifiers, capabilities, etc.) about the delivery robot 11 with the delivery robot service provider 17.

The delivery robot 11 may share delivery status information (e.g., a current location of the delivery robot 11, a goods loading status, a type of goods, a condition of goods, etc.) with the delivery robot service provider 17.

The delivery robot 11 may identify one or more user devices associated with goods to be delivered. For example, the delivery robot 11 may identify a user device associated with loading the goods and a user device associated with unloading the goods (e.g., a user device of a recipient).

In a case where the goods are loaded or unloaded by an entity (e.g., a human or another robot) other than the delivery robot 11, the delivery robot 11 may notify the delivery robot service provider 17 that it is waiting to load or unload the goods after arriving at a loading location (or a "pick-up location" herein) or an unloading location (or a "drop-off location" or a "delivery location" herein).

The delivery robot 11 may receive, from the entity (e.g., a human or another robot) responsible for loading or unloading the goods, information indicating that the loading or unloading is completed. After receiving the information, the delivery robot 11 may notify the delivery robot service provider 17 that the loading or unloading is completed.

In a case where the goods are loaded or unloaded by the delivery robot 11, the delivery robot 11 may, after completing loading or unloading the goods, notify the delivery robot service provider 17 that the loading or unloading is completed.

After arriving at the urban infrastructure 19, the delivery robot 11 may notify the delivery robot service provider 17 that it is waiting to access the urban infrastructure 19.

The delivery robot 11 may request the delivery robot service provider 17 to transmit additional information required for autonomous driving or to access the urban infrastructure 19.

The delivery robot 11 may remain temporally synchronized with the delivery robot service provider 17.

In a case where the delivery robot 11 encounters an event (e.g., a breakdown of the delivery robot 11) that may impede delivery, the delivery robot 11 may notify the delivery robot service provider 17 of information related to the event. The delivery robot 11 may take necessary action to resolve the event.

The delivery robot 11 may directly interwork with the user device 13, the urban infrastructure 19, and other delivery robots (e.g., another delivery robot 21 in FIG. 10), as needed. For example, in a case where a collision with another delivery robot (e.g., the other delivery robot 21) located within a preset distance (or a distance detectable by a sensor) from the delivery robot 11 is predicted, the delivery robot 11 may directly interwork with the other delivery robot 21. In a case where congestion is predicted due to sharing a confined space (e.g., a stairwell) with the other delivery robot 21, the delivery robot 11 may directly interwork with the other delivery robot 21. In this case, the delivery robot 11 may calculate a congestion level based on at least one of an area size of space around the delivery robot 11, a type of space around the delivery robot 11, a size of the delivery robot 11, or a size of the other delivery robot 21. For example, the delivery robot 11 may determine the congestion level to be higher as the space (e.g., an elevator) around the delivery robot 11 is more likely to be occupied by people. In this example, when the congestion level satisfies a threshold value, the delivery robot 11 may directly interwork with other delivery robot 21. In a case where communication with the delivery robot service provider 17 fails, the delivery robot 11 may directly interwork with the urban infrastructure 19. In a case where the delivery robot 11 needs to travel to a location near the user device 13 or user authentication is required, the delivery robot 11 may directly interwork with the user device 13.

The delivery robot 11 may notify the delivery robot service provider 17 of a result of the direct interworking.

The delivery robot 11 may interwork with the other delivery robot 21 through the delivery robot service provider 17.

The delivery robot 11 may receive a request from the delivery robot service provider 17 to handle a certain task preferentially. The delivery robot 11 may handle the requested task preferentially. The delivery robot 11 may transmit a result of handling the requested task to the delivery robot service provider 17.

The user device 13 may include one or more devices. For example, the user device 13 may include one or more of a device of a delivery requester, a device associated with loading goods, and a device associated with unloading goods. The devices described herein may include an electronic device operated by a user, such as, for example, a mobile device and a computing device, and/or an unattended electronic device configured to store and/or manage goods. The user device 13 may directly interwork with the delivery robot service provider 17 and the delivery robot 11.

The user device 13 may provide functionality (e.g., a user interface (UI)) to receive a delivery request from the user and provide delivery status information to the user.

The user device 13 may transmit delivery information input from the user to the delivery robot service provider 17.

The user device 13 may collect location information of the user device 13.

In response to receiving information that needs to be confirmed or processed by the user, the user device 13 may notify the user of this using various means (e.g., sound, vibration, light, etc.).

The user device 13 may directly interwork with the delivery robot 11 located near the user device 13. For example, when the delivery robot 11 is located within a preset distance from the user device 13, the user device 13 may directly interwork with the delivery robot 11.

When a request for loading or unloading goods is received from the delivery robot service provider 17, the user device 13 may notify the user (e.g., a person responsible for the loading, or a recipient).

The user device 13 may notify the delivery robot service provider 17 that loading or unloading the goods is completed.

The external entity 15 may include, for example, a device (e.g., a server) of a public institution (e.g., an urban control center, a disaster management agency, and an emergency rescue agency) and a device (e.g., a server) of another delivery robot service provider. The external entity 15 may directly interwork with the delivery robot service provider 17.

The delivery robot service provider 17 may include a device such as a server. The delivery robot service provider 17 may manage the delivery robot 11. The delivery robot service provider 17 may directly interwork with the delivery robot 11, the user device 13, the external entity 15, and the urban infrastructure 19.

The delivery robot service provider 17 may hold and/or manage information (e.g., an identifier, capabilities, etc.) about the delivery robot 11.

The delivery robot service provider 17 may collect and manage information (e.g., locations, identifiers, capabilities, etc.) about the urban infrastructure 19.

In response to receiving a delivery request from the user device 13, the delivery robot service provider 17 may determine whether there is an available delivery robot (e.g., the delivery robot 11). Based on the available delivery robot, the delivery robot service provider 17 may transmit information (e.g., approving the delivery request or rejecting the delivery request) to the user device 13.

The delivery robot service provider 17 may identify one or more user devices associated with the received delivery request. For example, the delivery robot service provider 17 may identify a user device of a delivery requester, a user device associated with loading goods, and a user device associated with unloading the goods (e.g., a user device of a recipient).

The delivery robot service provider 17 may generate delivery information for the delivery request. The delivery information may include at least one of the following: a pick-up location, a delivery location (or a drop-off location), a delivery time, information (e.g., location, identifier, etc.) about an infrastructure that needs to be interworked with a delivery robot, a delivery route, a type of goods, a weight of the goods, a size of the goods, and a delivery condition (e.g., appropriate temperature).

The delivery robot service provider 17 may assign a delivery robot (e.g., the delivery robot 11) for the delivery request, simultaneously with or separately from generating the delivery request.

The delivery robot service provider 17 may collect information such as a current location, a movement direction, a status (e.g., breakdown, battery status, etc.), a goods loading status, and a goods condition (e.g., temperature) of the delivery robot 11.

The delivery robot service provider 17 may transmit such delivery status information generated by the delivery robot 11 to the user device 13.

After the delivery robot 11 arrives at a pick-up location or a delivery location (or a drop-off location), the delivery robot service provider 17 may notify the user device 13 that the delivery robot 11 is waiting to load or unload goods.

After the delivery robot 11 arrives at the urban infrastructure 19, the delivery robot service provider 17 may notify the urban infrastructure 19 that the delivery robot 11 is waiting to interwork with the urban infrastructure 19.

The delivery robot service provider 17 may notify the delivery robot 11 of a response (e.g., a result of requesting interworking) to a request for interworking received from the urban infrastructure 19.

The delivery robot service provider 17 may collect additional information, in addition to the delivery information, from the urban infrastructure 19 and/or the external entity 15. The delivery robot service provider 17 may provide the collected additional information to the delivery robot 11.

The delivery robot service provider 17 may receive, from the user device 13, information indicating that loading or unloading goods is completed. The delivery robot service provider 17 may transmit the received information to the delivery robot 11.

The delivery robot service provider 17 may receive, from the delivery robot 11, information indicating that loading or unloading goods is completed. The delivery robot service provider 17 may transmit the received information to the user device 13.

The delivery robot service provider 17 may determine whether the delivery robot 11 is able to continue to deliver goods, based on the delivery status information generated by the delivery robot 11.

The delivery robot service provider 17 may receive a result of the direct interworking from the delivery robot 11. In response to receiving the result, the delivery robot service provider 17 may update the delivery information.

The delivery robot service provider 17 may receive a request from the external entity 15. For example, the external entity 15 may request the delivery robot service provider 17 to transmit visual information about a space around the delivery robot 11. The delivery robot service provider 17 may evaluate (or determine) the request (e.g., the contents of the request) from the external entity 15. The delivery robot service provider 17 may classify the request from the external entity 15 as an urgent request/non-urgent request. The delivery robot service provider 17 may notify the delivery robot 11 of the request from the external entity 15. For example, when the request from the external entity 15 needs to be handled preferentially, the delivery robot service provider 17 may transmit, to the delivery robot 11, priority information of the request along with the request from the external entity 15.

The delivery robot service provider 17 may process the request from the external entity 15 and notify the external entity 15 of a processing result obtained by processing the request.

In a case where a plurality of delivery robots is waiting to interwork with the same urban infrastructure, the delivery robot service provider 17 may determine a priority among the plurality of delivery robots. The priority described herein may refer to an order in which the plurality of delivery robots is to use the urban infrastructure. To determine the priority, the delivery robot service provider 17 may use delivery status information (e.g., a type of good, a condition of the good, etc.) of each of the plurality of delivery robots.

The delivery robot service provider 17 may receive, from the delivery robot 11, a result of interworking (e.g., direct interworking) between the delivery robot 11 and another delivery robot (e.g., the other delivery robot 21). The delivery robot service provider 17 may determine, from the received result, that the other delivery robot 21 is managed by another delivery service provider (e.g., another delivery robot service provider 35 in FIG. 10). The delivery robot service provider 17 may determine, from the received result, that the delivery robot 11 and the other delivery robot 21 are waiting to interwork with the same urban infrastructure. The delivery robot service provider 17 may interwork with the other delivery robot service provider 35 to coordinate the priority between the delivery robot 11 and the other delivery robot 21.

The delivery robot service provider 17 may convert a specific coordinate system (e.g., a cartesian coordinate system) to another coordinate system (e.g., a spherical coordinate system). The delivery robot service provider 17 may use any suitable coordinate system to identify a current location of the delivery robot 11. The delivery robot service provider 17 may use any suitable coordinate system to assist the delivery robot 11 in its operations (e.g., loading and unloading goods or access to the urban infrastructure 19). The delivery robot service provider 17 may use any suitable coordinate system to exchange information with the other delivery robot service provider 35.

The urban infrastructure 19 may include facilities (e.g., elevators, gates, communal entrances, electric charging stations, etc.) the delivery robot 11 needs to use, access, and/or pass through to deliver goods. The urban infrastructure 19 described herein may refer to a device (e.g., a server) that manages the urban infrastructure 19. The urban infrastructure 19 may directly interwork with the delivery robot 11 and the delivery robot service provider 17.

The urban infrastructure 19 may share information about the urban infrastructure 19 (e.g., identifiers, capabilities, locations, etc.) with the delivery robot service provider 17.

The urban infrastructure 19 may notify the delivery robot service provider 17 of whether the delivery robot 11 is approved to access the urban infrastructure 19.

The urban infrastructure 19 may request the delivery robot service provider 17 to transmit information about goods loaded on the delivery robot 11.

The urban infrastructure 19 may directly interwork with the delivery robot service provider 17. The urban infrastructure 19 may interwork with the delivery robot service provider 17 through other systems (e.g., a building management system, an external infrastructure management service system, etc.).

The urban infrastructure 19 may directly interwork with the delivery robot 11 located near the urban infrastructure 19.

In response to the request from the delivery robot service provider 17, the urban infrastructure 19 may provide the information about the urban infrastructure 19 (e.g., service status, availability, breakdown, inspection, etc.) to the delivery robot service provider 17.

The delivery robot service system 10 may have a data security means (e.g., communication encryption) for interworking.

The delivery robot service system 10 may have a means to prevent the forgery of data for interworking.

The delivery robot service system 10 may have a means to prevent leakage of user personal information and user location information.

Figure 3:
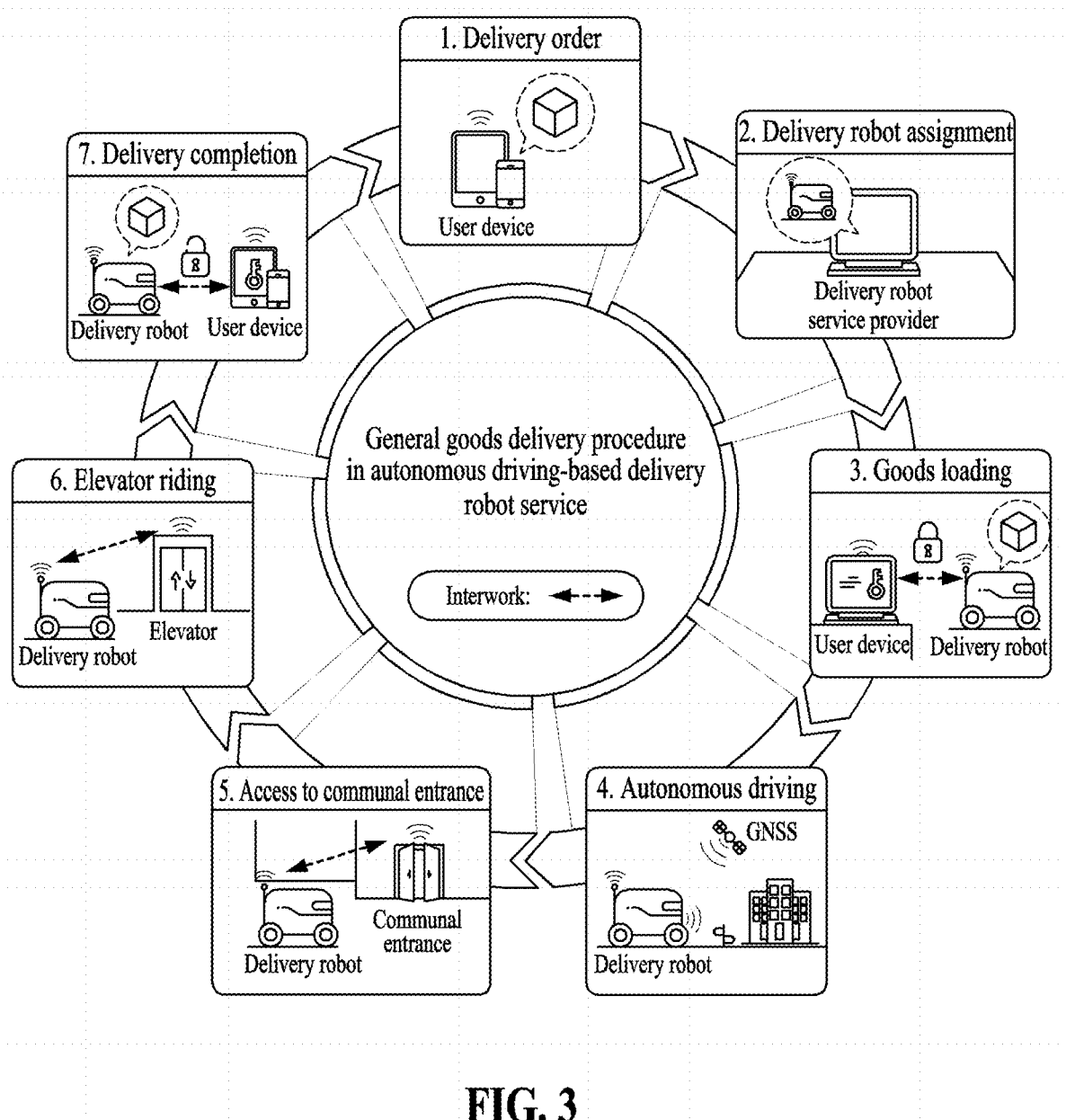
FIG. 3 is a schematic diagram illustrating a flow of a delivery robot service according to an example embodiment.

FIG. 3 is a schematic diagram illustrating a flow of a delivery robot service according to an example embodiment.

Referring to FIG. 3, according to an example embodiment, a user device (e.g., the user device 13 in FIG. 1) may transmit a delivery request from a user to a delivery robot service provider (e.g., the delivery robot service provider 17 in FIG. 1).

The delivery robot service provider 17 may confirm the delivery request and assign a delivery robot (e.g., the delivery robot 11 in FIG. 1) that is to perform a corresponding delivery.

The delivery robot 11 may perform autonomous driving to travel to a pick-up location of goods. The delivery robot 11 may interwork with the user device 13 to load the goods.

The delivery robot 11 may perform autonomous driving to travel to a destination (e.g., a delivery location) with the goods loaded thereon.

The delivery robot 11 may interwork with an urban infrastructure (e.g., the urban infrastructure 19 in FIG. 1) located on a delivery route. For example, to use a communal entrance and an elevator, the delivery robot 11 may communicate with their management systems (e.g., servers).

After arriving at the destination, the delivery robot 11 may unload the goods. The delivery robot 11 may interwork with the user device 13 to unload the goods.

Figure 4:
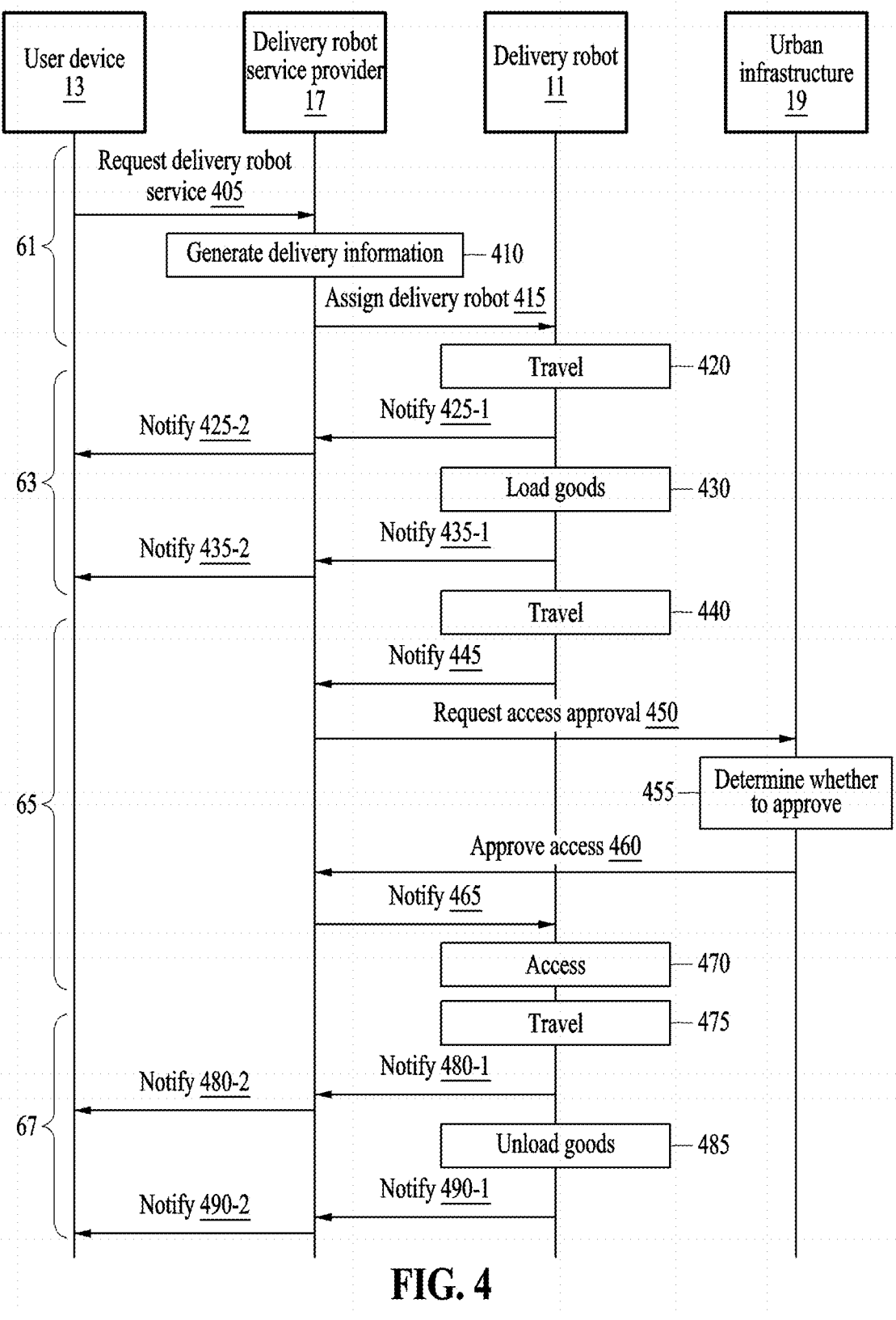
FIG. 4 is a schematic diagram illustrating a flow of a delivery robot service system according to an example embodiment.

FIG. 4 is a schematic diagram illustrating a flow of a delivery robot service system according to an example embodiment.

Referring to FIG. 4, according to an example embodiment, a delivery process may include a delivery request phase 61, a loading phase 63, an infrastructure access phase 65, and an unloading phase 67. However, the infrastructure access phase 65 may be omitted along a delivery route or may be added between the delivery request phase 61 and the loading phase 63. Operations 405 through 490-2 described below may be performed sequentially but are not limited thereto. For example, one or more operations may be omitted or added, or two or more operations may be performed in parallel.

In operation 405, the user device 13 (e.g., a device of a delivery requester) may transmit a delivery request to the delivery robot service provider 17. The delivery robot service provider 17 may receive the delivery request and determine whether there is an available delivery robot. When there is an available delivery robot (e.g., the delivery robot 11), the delivery robot service provider 17 may transmit a delivery request approval to the user device 13.

In operation 410, the delivery robot service provider 17 may generate delivery information for the approved delivery request. The delivery information may include at least one of the following: a pick-up location, a delivery location, a delivery time, information (e.g., locations, identifiers, etc.) about an infrastructure that needs to be interworked with a delivery robot, a delivery route, a type of good, a weight of the good, a size of the good, and a delivery condition (e.g., appropriate temperature).

In operation 415, the delivery robot service provider 17 may assign the delivery robot 11 that is to perform the approved delivery request.

In operation 420, the delivery robot 11 may perform autonomous driving to travel to a pick-up location of goods.

In operation 425-1, after arriving at the pick-up location, the delivery robot 11 may notify the delivery robot service provider 17 that the delivery robot 11 is waiting to load the goods.

In operation 425-2, the delivery robot service provider 17 may notify the user device 13 (e.g., a robot, a device of a person managing the loading, etc.) that the delivery robot 11 is waiting to load the goods.

In operation 430, the delivery robot 11 may load the goods.

In operation 435-1, the delivery robot 11 may notify the delivery robot service provider 17 that loading the goods is completed.

In operation 435-2, the delivery robot service provider 17 may notify the user device 13 that loading the goods is completed.

In operation 440, the delivery robot 11 may perform autonomous driving to travel to a delivery location (e.g., a destination).

In operation 445, when the delivery robot 11 arrives at the urban infrastructure 19 located on a delivery route, the delivery robot 11 may notify the delivery robot service provider 17 that the delivery robot 11 is waiting to access the urban infrastructure 19.

In operation 450, the delivery robot service provider 17 may transmit an access approval request to the urban infrastructure 19.

In operation 455, the urban infrastructure 19 may determine whether to approve the access.

In operation 460, the urban infrastructure 19 may notify the delivery robot service provider 17 that the access is approved.

In operation 465, the delivery robot service provider 17 may notify the delivery robot 11 that the access is approved.

In operation 470, the delivery robot 11 may access the urban infrastructure 19. For example, the delivery robot 11 may enter an elevator or pass through a communal entrance.

In operation 475, the delivery robot 11 may perform autonomous driving to travel to the delivery location (e.g., the destination).

In operation 480-1, upon arriving at the delivery location, the delivery robot 11 may notify the delivery robot service provider 17 that the delivery robot 11 is waiting to unload the goods.

In operation 480-2, the delivery robot service provider 17 may notify the user device 13 (e.g., a robot, a device of a recipient, etc.) that the delivery robot 11 is waiting to unload the goods.

In operation 485, the delivery robot 11 may unload the goods.

In operation 490-1, the delivery robot 11 may notify the delivery robot service provider 17 that unloading the goods is completed.

In operation 490-2, the delivery robot service provider 17 may notify the user device 13 that unloading the goods is completed.

Figure 5:
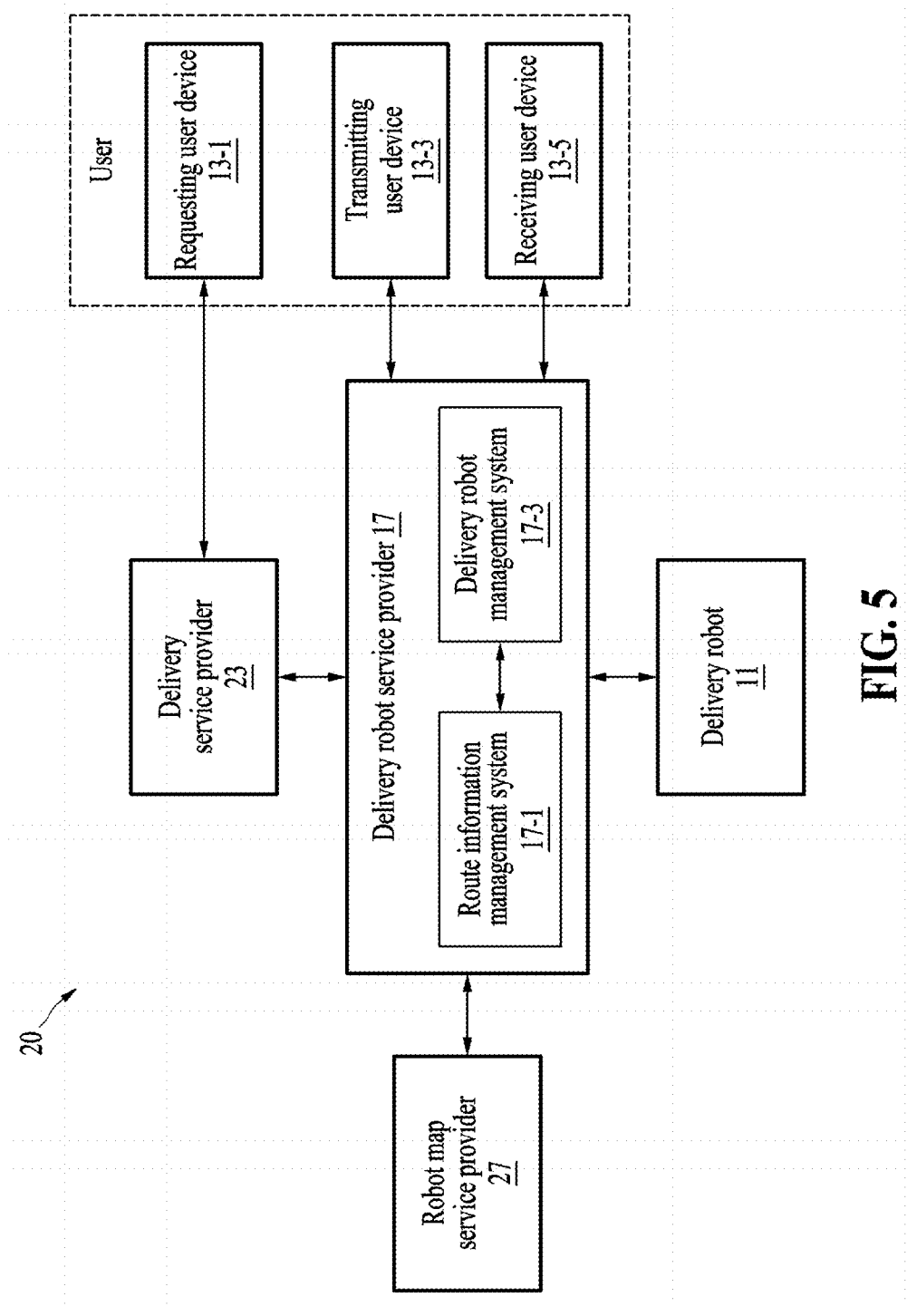
FIG. 5 is a diagram illustrating a delivery robot service system according to an example embodiment.

FIG. 5 is a diagram illustrating a delivery robot service system according to an example embodiment.

Referring to FIG. 5, according to an example embodiment, a delivery robot service system 20 may provide an unattended delivery service using an autonomous driving-based robot (e.g., the delivery robot 11) that performs loading and unloading of goods along a predetermined route based on delivery information requested by a user. The delivery robot service system 20 may include a delivery robot 11, a user device (e.g., a requesting user device 13-1, a transmitting user device 13-3, and a receiving user device 13-5), a delivery robot service provider 17, a delivery service provider 23, and a robot map service provider 27.

The delivery service provider 23 may provide a service for delivering goods (or simply a goods delivery service). The delivery service provider 23 may manage requests (or goods delivery requests) for delivering goods to users who request the goods delivery service such that the user may use the service. To manage the goods delivery requests, the delivery service provider 23 may generate delivery information and transmit delivery completion information. The delivery service provider 23 may be implemented as a server (e.g., a server device).

The delivery service provider 23 may receive a delivery request (e.g., a delivery request from a user) from the requesting user device 13-1. The delivery service provider 23 may generate delivery information for the delivery request and transmit it to the delivery robot service provider 17. The delivery information may include at least one of the following: a pick-up location, a delivery location, a delivery time, information about one or more infrastructures (e.g., the urban infrastructure 19) that need to be interworked with a delivery robot (e.g., the delivery robot 11), a delivery route, a type of good, a weight of the good, a size of the good, and a delivery condition (e.g., appropriate temperature). The one or more infrastructures may be located along the delivery route.

The delivery robot service provider 17 may operate and manage the delivery robot 11, and may generate and manage route information for the delivery robot 11 to perform goods delivery and charging. The delivery robot service provider 17 may include a route information management system 17-1 configured to manage the route information and a delivery robot management system 17-3 configured to manage the delivery robot 11. The delivery robot management system 17-3 may assign the delivery robots 11 that is to deliver goods based on the delivery information. The delivery robot management system 17-3 may notify the user device (e.g., the transmitting user device 13-3 or the receiving user device 13-5) that the delivery robot 11 is waiting to load/unload the goods, and may notify the delivery robot 11 that loading/unloading the goods is completed. The route information management system 17-1 may generate the route information for delivering the goods based on the delivery information. The route information management system 17-1 may generate the route information using robot map information obtained from the robot map service provider 27 and the delivery information.

The robot map service provider 27 may generate and provide the robot map information (e.g., including a map and spatial object information) for the delivery robot 11.

The delivery robot 11 may perform autonomous driving to travel to a pick-up location/delivery location (e.g., a destination) of the goods based on the route information. The delivery robot 11 may be a device associated with loading the goods and/or a device associated with unloading the goods.

The requesting user device 13-1 may be a device of a delivery requester. The requesting user device 13-1 may transmit a delivery request to the delivery service provider 23 to request delivering goods based on an input from a user (e.g., the delivery requester).

The transmitting user device 13-3 may be a device associated with loading goods. The transmitting user device 13-3 may receive, from the delivery robot service provider 17, information (e.g., loading request information) indicating that the delivery robot 11 is waiting to load the goods. An object (e.g., a human, another robot, etc.) located at a pick-up location (or a loading location) may load the goods onto the delivery robot 11. After the object located at the pick-up location loads the goods onto the delivery robot 11, the transmitting user device 13-3 may transmit, to the delivery robot service provider 17, information (e.g., loading completion information) indicating that loading the goods is completed.

The receiving user device 13-5 may be a device associated with unloading goods. The receiving user device 13-5 may receive, from the delivery robot service provider 17, information (e.g., unloading request information) indicating that the delivery robot 11 is waiting to unload the goods. An object (e.g., a human, another robot, etc.) located at a delivery location (or an unloading location) may unload the goods from the delivery robot 11. After the object located at the delivery location unloads the goods from the delivery robot 11, the receiving user device 13-5 may transmit, to the delivery robot service provider 17, information (e.g., unloading completion information) indicating that unloading the goods is completed.

The requesting user device 13-1, the transmitting user device 13-3, and the receiving user device 13-5 may be different devices or two or more of them may be the same device. For example, the requesting user device 13-1, the transmitting user device 13-3, and the receiving user device 13-5 may be respective devices of different users. For another example, the requesting user device 13-1 and the transmitting user device 13-3 may be the same device of the same user, while the receiving user device 13-5 may be a device of another user. For another example, the requesting user device 13-1 and the receiving user device 13-5 may be the same terminal of the same user, while the transmitting user device 13-3 may be a device of another user.

The operations of the delivery robot 11, the user device (e.g., 13-1, 13-3, and 13-5), and/or the delivery robot service provider 17 described above may be substantially the same as what has been described above with reference to FIGS. 1 through 4, and the description thereof will not be repeated.

Figure 6:
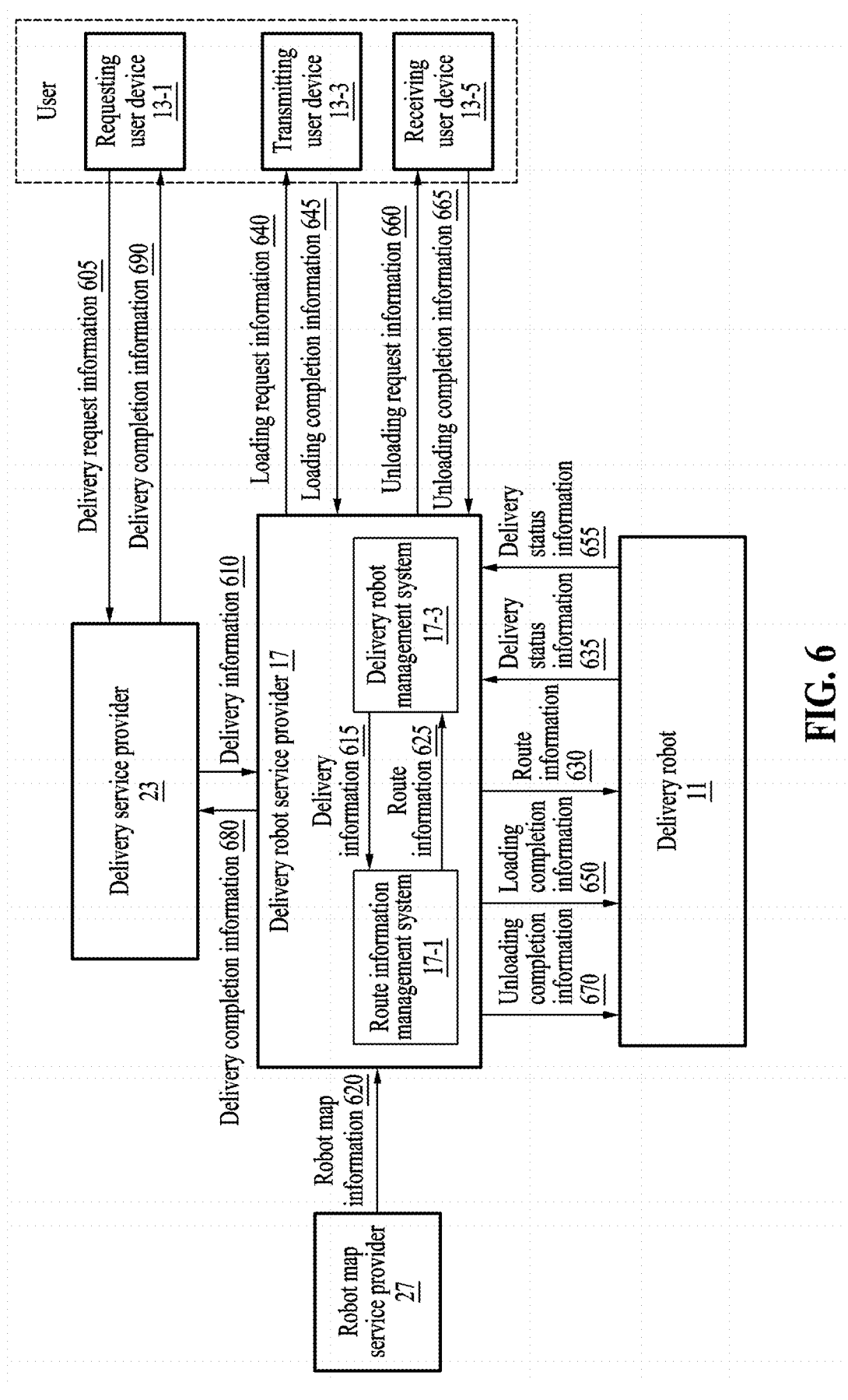
FIG. 6 is a diagram illustrating an autonomous driving robot-based delivery method according to an example embodiment.

FIG. 6 is a diagram illustrating an autonomous driving robot-based delivery method according to an example embodiment.

Referring to FIG. 6, according to an example embodiment, operations 605 through 690 described below may be performed sequentially but are not limited thereto. For example, one or more operations may be omitted or added, or two or more operations may be performed in parallel.

In operation 605, the requesting user device 13-1 may request the delivery service provider 23 to deliver goods. The requesting user device 13-1 may generate delivery request information to request the delivery of the goods and may transmit the delivery request information to the delivery service provider 23. The delivery request information may include the number N of times of loading (e.g., N is a natural number greater than 1) and/or the number M of times of unloading (e.g., M is a natural number greater than 1). In this case, N may denote the number of pick-up locations (or loading locations), and M may denote the number of delivery locations (or unloading or drop-off locations).

In operation 610, the delivery service provider 23 may generate delivery information based on the delivery request information and transmit the delivery information to the delivery robot management system 17-3 included in the delivery robot service provider 17. The delivery information may include at least one of the following: the N pick-up locations, the M delivery locations, a delivery time, information about one or more infrastructures (e.g., the urban infrastructure 19) that need to be interworked with a delivery robot (e.g., the delivery robot 11), a delivery route, a type of good, a weight of the good, a size of the good, and a delivery condition (e.g., appropriate temperature). The one or more infrastructures may be located along the delivery route.

In operation 615, the delivery robot management system 17-3 may identify and/or assign the delivery robot 11 (e.g., a delivery robot available to deliver goods) that is to perform the delivery request based on the delivery information, extract (or derive) pick-up/delivery locations (e.g., loading/unloading location information) from the delivery information, and request the route information management system 17-1 included in the delivery robot service provider 17 for route information including the pick-up/delivery locations. The delivery robot management system 17-3 may transmit the delivery information to the route information management system 17-1 while requesting the route information.

In operation 620, the route information management system 17-1 may obtain robot map information from the robot map service provider 27. The robot map information may include latest robot map information stored (or archived) in a robot map database (DB) (not shown) included in the robot map service provider 27. The route information management system 17-1 may request the robot map service provider 27 for the robot map information, and the robot map service provider 27 may transmit the robot map information (e.g., the latest robot map information) to the route information management system 17-1 in response to the request from the route information management system 17-1. The route information management system 17-1 may also obtain (e.g., receive) the robot map information from the robot map service provider 27 in advance. The route information management system 17-1 may receive continuously updated robot map information from the robot map service provider 27.

In operation 625, the route information management system 17-1 may generate route information for an optimal route between a pick-up location and a delivery location based on the pick-up/delivery locations included in the delivery information and the robot map information, and may transmit the route information to the delivery robot management system 17-3. In a case where the delivery information includes the N pick-up locations and the M delivery locations, the route information management system 17-1 may determine a different order of loading and unloading based on the route information.

In operation 630, the delivery robot management system 17-3 may transmit the route information to the delivery robot 11 that is to deliver the goods.

In operation 635, the delivery robot 11 may generate delivery status information (e.g., a current location of the delivery robot 11, status information of the delivery robot 11, a goods loading status, a type of the goods, and a condition of the goods), and transmit the delivery status information to the delivery robot management system 17-3. For example, the delivery robot 11 may travel to the pick-up location based on the route information. The delivery robot 11 may generate the delivery status information while traveling to the pick-up location and transmit the delivery status information to the delivery robot management system 17-3. The delivery status information may be first delivery status information, in operation 635.

In operation 640, the delivery robot management system 17-3 may check whether the delivery robot 11 arrives at the pick-up location based on the delivery status information. When the delivery robot 11 arrives at the pick-up location, the delivery robot management system 17-3 may transmit loading request information to the transmitting user device 13-3. The transmitting user device 13-3 may recognize that the delivery robot 11 is waiting to load the goods based on the loading request information.

In operation 645, an object (e.g., a human, another robot, etc.) located at the pick-up location may check the loading request information through the transmitting user device 13-3 and may load the goods onto the delivery robot 11 based on the loading request information. In this case, the delivery robot 11 may also load the goods. After the object located at the pick-up location loads the goods onto the delivery robot 11, the transmitting user device 13-3 and/or the delivery robot 11 may transmit, to the delivery robot management system 17-3, loading completion information indicating that loading the goods is completed.

In operation 650, the delivery robot management system 17-3 may transmit the loading completion information to the delivery robot 11. In this case, when the delivery robot 11 transmits the loading completion information to the delivery robot management system 17-3, the delivery robot management system 17-3 may transmit the loading completion information to the transmitting user device 13-3 to notify the transmitting user device 13-3 of the completion of loading the goods.

In operation 655, after receiving the loading completion information, the delivery robot 11 may perform autonomous driving to travel to the delivery location based on the route information. While traveling to the delivery location, the delivery robot 11 may generate delivery status information (e.g., a current location of the delivery robot 11, status information of the delivery robot 11, a goods loading status, a type of goods, a condition of the goods, etc.), and transmit the delivery status information to the delivery robot management system 17-3. The delivery status information may be second delivery status information, in operation 655.

In operation 660, the delivery robot management system 17-3 may determine whether the delivery robot 11 arrives at the delivery location based on the delivery status information. When the delivery robot 11 arrives at the delivery location, the delivery robot management system 17-3 may transmit unloading request information to the receiving user device 13-5. The receiving user device 13-5 may recognize from the unloading request information that the delivery robot 11 is waiting to unload the goods.

In operation 665, an object (e.g., a human, another robot, etc.) located at the delivery location may check the unloading request information through the receiving user device 13-5, and unload the goods from the delivery robot 11 based on the unloading request information. In this case, the delivery robot 11 may also unload the goods. After the object located at the delivery location unloads the goods from the delivery robot 11, the receiving user device 13-5 and/or the delivery robot 11 may transmit, to the delivery robot management system 17-3, unloading completion information indicating that unloading the goods is completed.

In operation 670, the delivery robot management system 17-3 may transmit the unloading completion information to the delivery robot 11. In this case, when the delivery robot 11 transmits the unloading completion information to the delivery robot management system 17-3, the delivery robot management system 17-3 may transmit the unloading completion information to the receiving user device 13-5 to notify the receiving user device 13-5 of the completion of unloading the goods.

In operation 680, the delivery robot management system 17-3 may generate delivery completion information based on the unloading completion information, and may transmit the delivery completion information to the delivery service provider 23.

In operation 690, the delivery service provider 23 may transmit the delivery completion information to the requesting user device 13-1.

For example, in a case where the delivery request information includes N pick-up locations, operations 635 through 650 may be performed N times. At each of the N pick-up locations, goods may be loaded onto the delivery robot 11.

For another example, in a case where the delivery request information includes M delivery locations, operations 655 through 670 may be performed M times. At each of the M delivery locations, goods may be unloaded from the delivery robot 11.

For still another example, in a case where the delivery request information includes N number of times of loading and M number of times of unloading, the delivery robot 11 may perform the delivery in sequential order of loading and unloading based on the route information. For example, in a case where a user orders coffee, bottled water, and digestive medicine from 1) a cafe, 2) a convenience store, and 3) a drug store, respectively, and requests that the coffee be delivered to 4) a workplace, and the remaining ones including the bottled water and the digestive medicine be delivered to 5) a home, the delivery robot service provider 17 may generate (or calculate) route information, such as, for example, loading 1 (e.g., coffee @ cafe)→loading 2 (e.g., bottled water @ convenience store)→unloading 1 (e.g., coffee @ workplace)→loading 3 (e.g., digestive medicine @ drug store)→unloading 2 (e.g., bottled water and digestive medicine @ home). The delivery robot 11 may perform three times of loading and two times of unloading based on the route information. As described above, in a case where the delivery request information includes N times of loading and M times of unloading, the order of loading and unloading may vary depending on route information.

Figure 7:
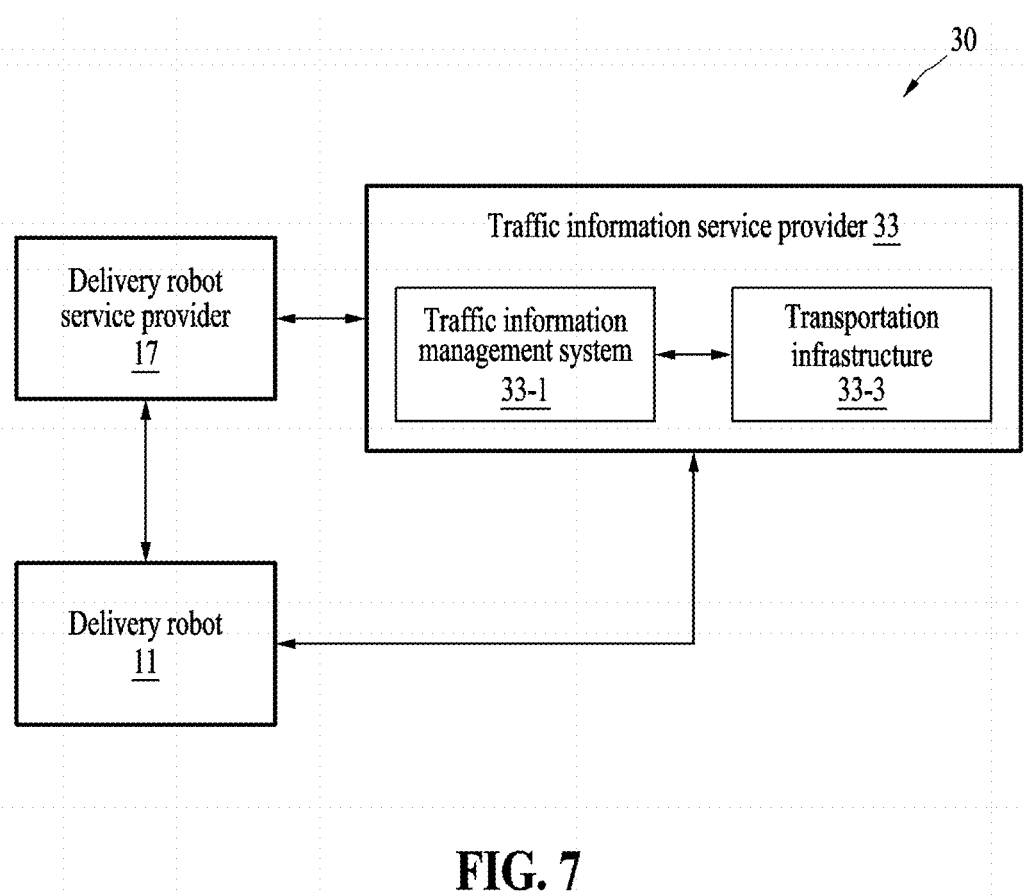
FIG. 7 is a diagram illustrating a delivery robot service system according to an example embodiment.

FIG. 7 is a diagram illustrating a delivery robot service system according to an example embodiment.

Referring to FIG. 7, according to an example embodiment, a delivery robot service system 30 may include a delivery robot 11, a delivery robot service provider 17, and a traffic information service provider 33. In the delivery robot service system 30, the delivery robot 11 may directly interwork with the delivery robot service provider 17 and/or the traffic information service provider 33. The operations of the delivery robot 11 and/or the delivery robot service provider 17 may be substantially the same as what has been described above with reference to FIGS. 1 through 6, and thus a detailed description thereof will be omitted here for brevity. The traffic information service provider 33, which may be the urban infrastructure 19 described above with reference to FIGS. 1 through 6, may include a device (e.g., a server) (e.g., a traffic information management system 33-1) configured to manage a transportation infrastructure (e.g., a transportation infrastructure 33-3). The transportation infrastructure 33-3 may include, for example, traffic lights. In a case where the delivery robot 11 needs to cross a road while traveling to make a delivery, the delivery robot 11 may directly interwork with the delivery robot service provider 17 and/or the traffic information service provider 33 to collect information, such as, for example, information indicating whether a signal of the transportation infrastructure (e.g., traffic lights) at a crosswalk is red or green and, if green, collect information such as a residual green time.

The delivery robot service provider 17 may receive delivery information transmitted from a delivery service provider (e.g., the delivery service provider 23 in FIG. 5) that provides a goods delivery service. The delivery service provider 23 may generate delivery information for a delivery request (e.g., a delivery request from a user) and transmit the delivery information to the delivery robot service provider 17.

The delivery robot service provider 17 may generate the delivery information for the delivery request (e.g., the delivery request from the user). The delivery information may be delivery route information. The delivery information may include at least one of the following: a pick-up location, a delivery location, a delivery time, and information (e.g., location, identifier, communication method, transportation infrastructure signal status, and/or transportation infrastructure function information) about at least one transportation infrastructure (e.g., the transportation infrastructure 33-3) that needs to be interworked with the delivery robot 11, a delivery route, a type of good, a weight of the good, a size of the good, and a delivery condition (e.g., appropriate temperature). The at least one transportation infrastructure may be located along the delivery route.

After the delivery robot 11 arrives at the transportation infrastructure 33-3 managed by the traffic information service provider 33 (e.g., the traffic information management system 33-1), the delivery robot service provider 17 may notify the traffic information management system 33-1 that the delivery robot 11 is waiting to interwork with the transportation infrastructure 33-3.

The delivery robot service provider 17 may notify the delivery robot 11 of a response to an interworking request received from the traffic information service provider 33. The response to the interworking request may be a result of the interworking request.

The delivery robot service provider 17 may collect additional information, in addition to the delivery information, from the traffic information service provider 33. The delivery robot service provider 17 may provide the collected additional information to the delivery robot 11.

The delivery robot 11 may deliver goods based on the delivery information transmitted from the delivery robot service provider 17. The delivery robot 11 may perform autonomous driving to travel to a destination (e.g., a delivery location) with the goods loaded thereon. During the delivery, the delivery robot 11 may transmit delivery status information (or robot status information) (e.g., a current location of the delivery robot 11, status information of the delivery robot 11, a goods loading status, a type of the goods, a condition of the goods, etc.) to the delivery robot service provider 17.

The traffic information service provider 33 may share information (e.g., identifiers, capabilities, locations, signal statuses, etc.) about the at least one transportation infrastructure 33-3 with the delivery robot service provider 17. The traffic information service provider 33 may include the traffic information management system 33-1 and the transportation infrastructure 33-3.

The traffic information service provider 33 may directly interwork with the delivery robot service provider 17. The traffic information service provider 33 may interwork with the delivery robot service provider 17 through other systems (e.g., a building management system, an external infrastructure management service system, etc.).

The traffic information service provider 33 may directly interwork with the delivery robot 11 located near the at least one transportation infrastructure 33-3 managed by the traffic information service provider 33.

In response to a request from the delivery robot service provider 17, the traffic information service provider 33 may provide information (e.g., identifiers, capacities, locations, signal status, availability, breakdown, inspection, etc.) about the at least one transportation infrastructure 33-3 to the delivery robot service provider 17.

Figure 8:
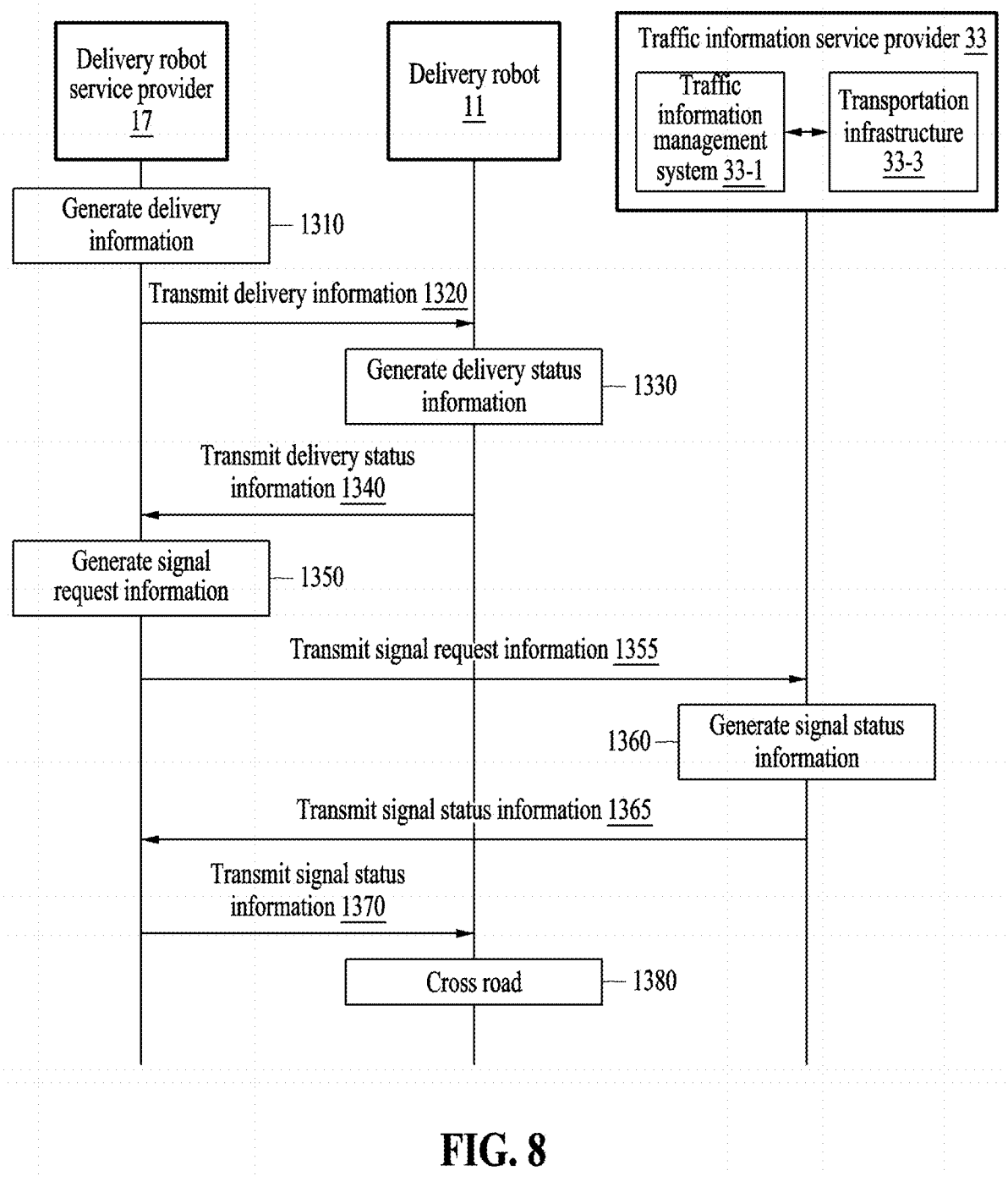
FIG. 8 is a flowchart illustrating an example of interworking with a traffic information service provider according to an example embodiment.

FIG. 8 is a flowchart illustrating an example of interworking with a traffic information service provider according to an example embodiment.

Referring to FIG. 8, according to an example embodiment, operations 1310 through 1380 described below may be performed sequentially but are not limited thereto. For example, one or more operations may be omitted or added, or two or more operations may be performed in parallel.

In operation 1310, the delivery robot service provider 17 may generate delivery information for a delivery request from a user. The delivery information may include at least one of the following: a pick-up location, a delivery location, a delivery time, information about at least one transportation infrastructure (e.g., the transportation infrastructure 33-3) (e.g., locations, identifiers, communication method, transportation infrastructure signal status, and/or transportation infrastructure function information) that is to be interworked with a delivery robot (e.g., the delivery robot 11), a delivery route, a type of good, a weight of the good, a size of the good, and a delivery condition (e.g., appropriate temperature). The at least one transportation infrastructure 33-3 may be located along the delivery route. The delivery information may be delivery information transmitted from a delivery service provider (e.g., the delivery service provider 23 in FIG. 5) that provides a goods delivery service. The delivery service provider 23 may generate delivery information for a delivery request (e.g., a delivery request from a user) and transmit the delivery information to the delivery robot service provider 17.

In operation 1320, the delivery robot service provider 17 may assign the delivery robot 11 that is to perform the delivery request, and transmit the delivery information to the delivery robot 11.

In operation 1330, the delivery robot 11 may perform autonomous driving to travel to a destination (e.g., a pick-up/delivery location) based on the delivery information, and may generate delivery status information (e.g., a current location of the delivery robot 11, status information of the delivery robot 11, a goods loading status, a type of the goods, a condition of the goods) while traveling. For example, after arriving at the transportation infrastructure 33-3, the delivery robot 11 may generate the delivery status information to cross a road using the transportation infrastructure 33-3 on the delivery route.

In operation 1340, the delivery robot 11 may share the delivery status information with the delivery robot service provider 17. The delivery robot 11 may transmit the delivery status information to the delivery robot service provider 17. The delivery robot 11 may transmit the delivery status information to the delivery robot service provider 17 to notify the delivery robot service provider 17 that it is waiting to use the transportation infrastructure 33-3.

In operations 1350 and 1355, the delivery robot service provider 17 may check whether the delivery robot 11 arrives at a location that uses the transportation infrastructure 33-3 based on the delivery status information, and may generate signal request information for the transportation infrastructure 33-3 and transmit the signal request information to the traffic information management system 33-1 included in the traffic information service provider 33.

In operations 1360 and 1365, the traffic information management system 33-1 may generate signal status information for the transportation infrastructure 33-3 based on the signal request information, and transmit the signal status information to the delivery robot service provider 17.

In operation 1370, the delivery robot service provider 17 may transmit the signal status information for the transportation infrastructure 33-3 to the delivery robot 11.

In operation 1380, the delivery robot 11 may cross the road and continue to travel to the destination, based on the signal status information.

Figure 9:
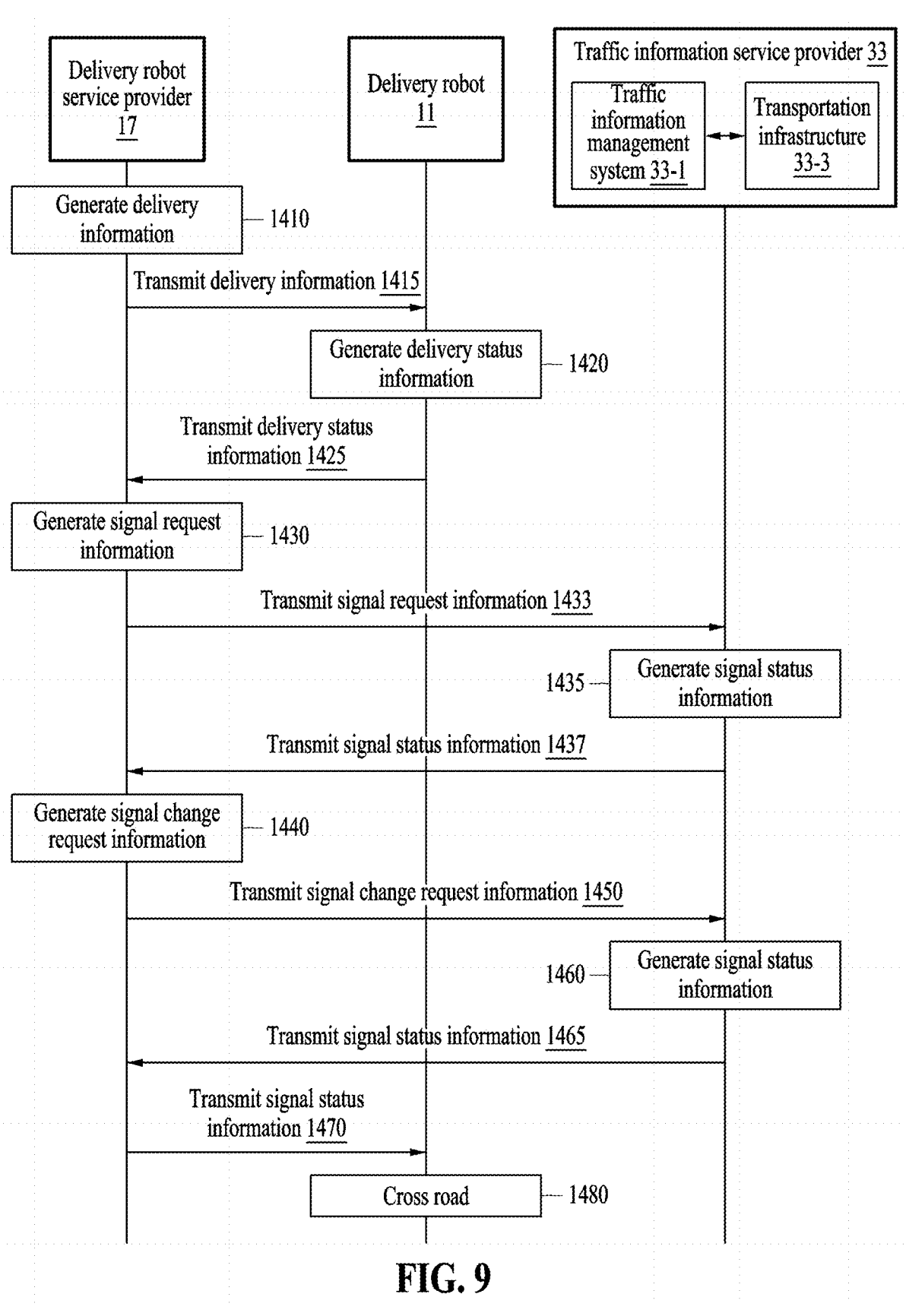
FIG. 9 is a flowchart illustrating another example of interworking with a traffic information service provider according to an example embodiment.

FIG. 9 is a flowchart illustrating another example of interworking with a traffic information service provider according to an example embodiment.

Referring to FIG. 9, according to an example embodiment, operations 1410 through 1480 described below may be performed sequentially but are not limited thereto. For example, one or more operations may be omitted or added, or two or more operations may be performed in parallel.

In operation 1410, the delivery robot service provider 17 may generate delivery information for a delivery request from a user. The delivery information may include at least one of the following: a pick-up location, a delivery location, a delivery time, information about at least one transportation infrastructure (e.g., the transportation infrastructure 33-3) (e.g., locations, identifiers, communication method, transportation infrastructure signal status, and/or transportation infrastructure function information) that is to be interworked with a delivery robot (e.g., the delivery robot 11), a delivery route, a type of good, a weight of the good, a size of the good, and a delivery condition (e.g., appropriate temperature). The at least one transportation infrastructure 33-3 may be located along the delivery route. The delivery information may be delivery information transmitted from a delivery service provider (e.g., the delivery service provider 23 in FIG. 5) that provides a goods delivery service. The delivery service provider 23 may generate the delivery information for the delivery request (e.g., the delivery request from the user) and transmit the delivery information to the delivery robot service provider 17.

In operation 1415, the delivery robot service provider 17 may assign the delivery robot 11 that is to perform the delivery request and transmit the delivery information to the delivery robot 11.

In operation 1420, the delivery robot 11 may perform autonomous driving to travel to a destination (e.g., a pick-up/delivery location) based on the delivery information, and may generate delivery status information (e.g., a current location of the delivery robot 11, status information of the delivery robot 11, a goods loading status, a type of goods, condition of the goods, etc.) while traveling. For example, after arriving at the transportation infrastructure 33-3, the delivery robot 11 may generate the delivery status information to cross a road using the transportation infrastructure 33-3.

In operation 1425, the delivery robot 11 may share the delivery status information with the delivery robot service provider 17. The delivery robot 11 may transmit the delivery status information to the delivery robot service provider 17. The delivery robot 11 may transmit the delivery status information to the delivery robot service provider 17 to notify the delivery robot service provider 17 that it is waiting to use the transportation infrastructure 33-3.

In operations 1430 and 1433, the delivery robot service provider 17 may check whether the delivery robot 11 arrives at a location that uses the transportation infrastructure 33-3 based on the delivery status information, and may generate signal request information for the transportation infrastructure 33-3 and transmit the signal request information to the traffic information management system 33-1 included in the traffic information service provider 17.

In operations 1435 and 1437, the traffic information management system 33-1 may generate signal status information for the transportation infrastructure 33-3 based on the signal request information, and transmit the signal status information to the delivery robot service provider 17.

In operation 1440, the delivery robot service provider 17 may determine whether a signal change is required for the transportation infrastructure 33-3 based on the signal status information, and when the signal change is determined to be required, may generate signal change request information for changing the signal of the transportation infrastructure 33-3.

In operation 1450, the delivery robot service provider 17 may transmit the signal change request information for changing the signal of the transportation infrastructure 33-3 to the traffic information management system 33-1.

In operations 1460 and 1465, the traffic information management system 33-1 may generate signal status information of the transportation infrastructure 33-3 based on the signal change request information, and transmit the signal status information to the delivery robot service provider 17 and the transportation infrastructure 33-3. The transportation infrastructure 33-3 may display a signal according to the signal status information.

In operation 1470, the delivery robot service provider 17 may transmit the signal status information of the transportation infrastructure 33-3 to the delivery robot 11.

In operation 1480, the delivery robot 11 may cross a road and continue to travel to the destination based on the signal status information.

Figure 10:
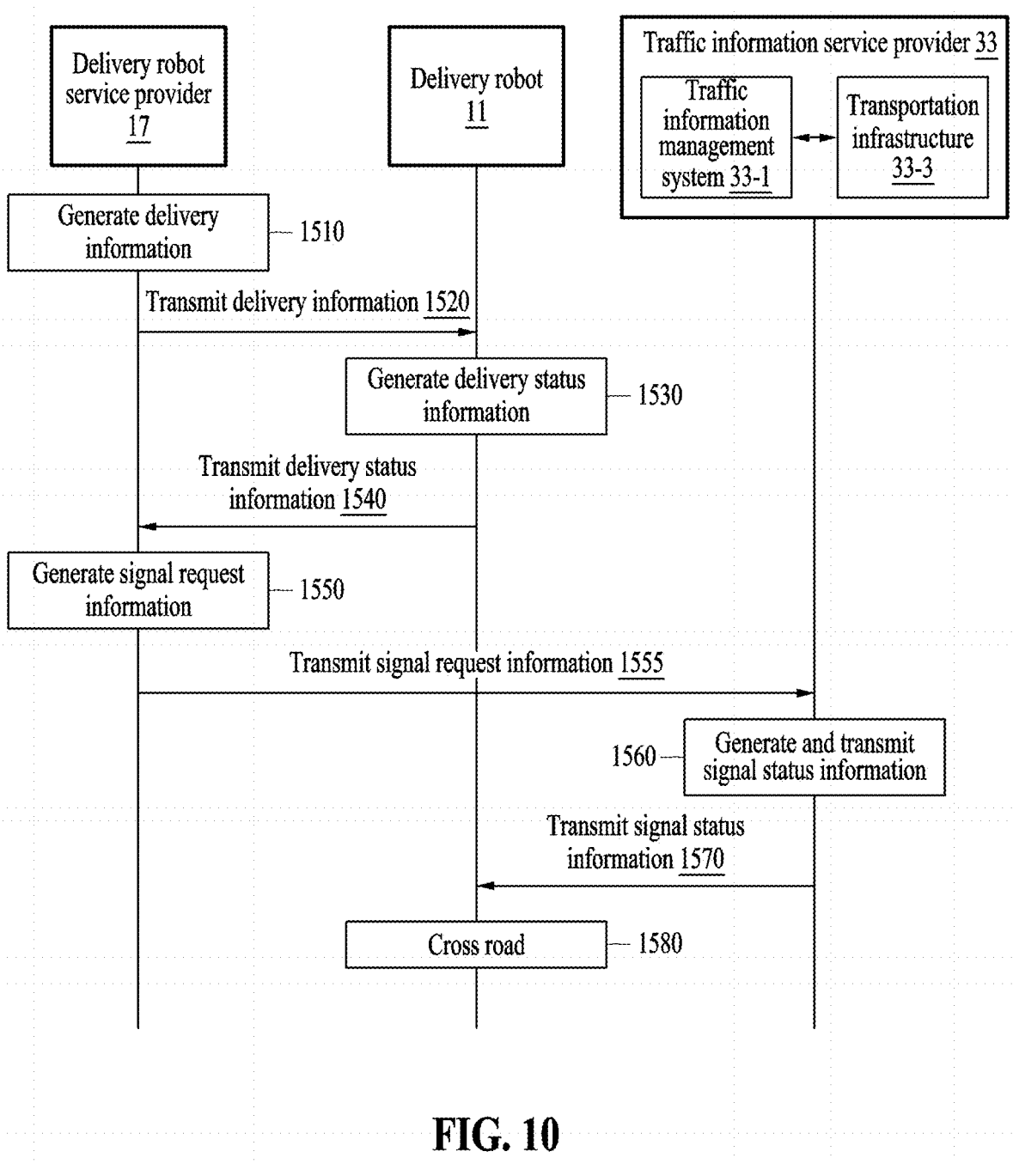
FIG. 10 is a flowchart illustrating still another example of interworking with a traffic information service provider according to an example embodiment.

FIG. 10 is a flowchart illustrating still another example of interworking with a traffic information service provider according to an example embodiment.

Referring to FIG. 10, according to an example embodiment, operations 1510 through 1580 described below may be performed sequentially but are not limited thereto. For example, one or more operations may be omitted or added, or two or more operations may be performed in parallel.

In operation 1510, the delivery robot service provider 17 may generate delivery information for a delivery request from a user. The delivery information may include at least one of the following: a pick-up location, a delivery location, a delivery time, information about at least one transportation infrastructure (e.g., the transportation infrastructure 33-3) (e.g., locations, identifiers, communication method, transportation infrastructure signal status, and/or transportation infrastructure function information) that is to be interworked with a delivery robot (e.g., the delivery robot 11), a delivery route, a type of good, a weight of the good, a size of the good, and a delivery condition (e.g., appropriate temperature). The at least one transportation infrastructure 33-3 may be located along the delivery route. The delivery information may be delivery information transmitted from a delivery service provider (e.g., the delivery service provider 23 in FIG. 5) that provides a goods delivery service. The delivery service provider 23 may generate the delivery information for the delivery request (e.g., the delivery request from the user) and transmit the delivery information to the delivery robot service provider 17.

In operation 1520, the delivery robot service provider 17 may assign the delivery robot 11 that is to perform the delivery request, and transmit the delivery information to the delivery robot 11.

In operation 1530, the delivery robot 11 may perform autonomous driving to travel to a destination (e.g., a pick-up/delivery location) based on the delivery information, and generate delivery status information (e.g., a current location of the delivery robot 11, status information of the delivery robot 11, a goods loading status, a type of goods, a condition of the goods, etc.) while traveling. For example, after arriving at the transportation infrastructure 33-3, the delivery robot 11 may generate the delivery status information to cross a road using the transportation infrastructure 33-3 on the delivery route.

In operation 1540, the delivery robot 11 may share the delivery status information with the delivery robot service provider 17. The delivery robot 11 may transmit the delivery status information to the delivery robot service provider 17. The delivery robot 11 may transmit the delivery status information to the delivery robot service provider 17 to notify the delivery robot service provider 17 that it is waiting to use the transportation infrastructure 33-3.

In operations 1550 and 1555, the delivery robot service provider 17 may check whether the delivery robot 11 arrives at a location that uses the transportation infrastructure 33-3 based on the delivery status information, and may generate signal request information for the transportation infrastructure 33-3 and transmit the signal request information to the traffic information management system 33-1 included in the traffic information service provider 33.

In operation 1560, the traffic information management system 33-1 may generate signal status information for the transportation infrastructure 33-3 based on the signal request information, and transmit the signal status information to the transportation infrastructure 33-3.

In operation 1570, the transportation infrastructure 33-3 may transmit the signal status information about the transportation infrastructure 33-3 to the delivery robot 11.

In operation 1580, the delivery robot 11 may cross the road and continue to travel to the destination, based on the signal status information.

Figures 11, 12:
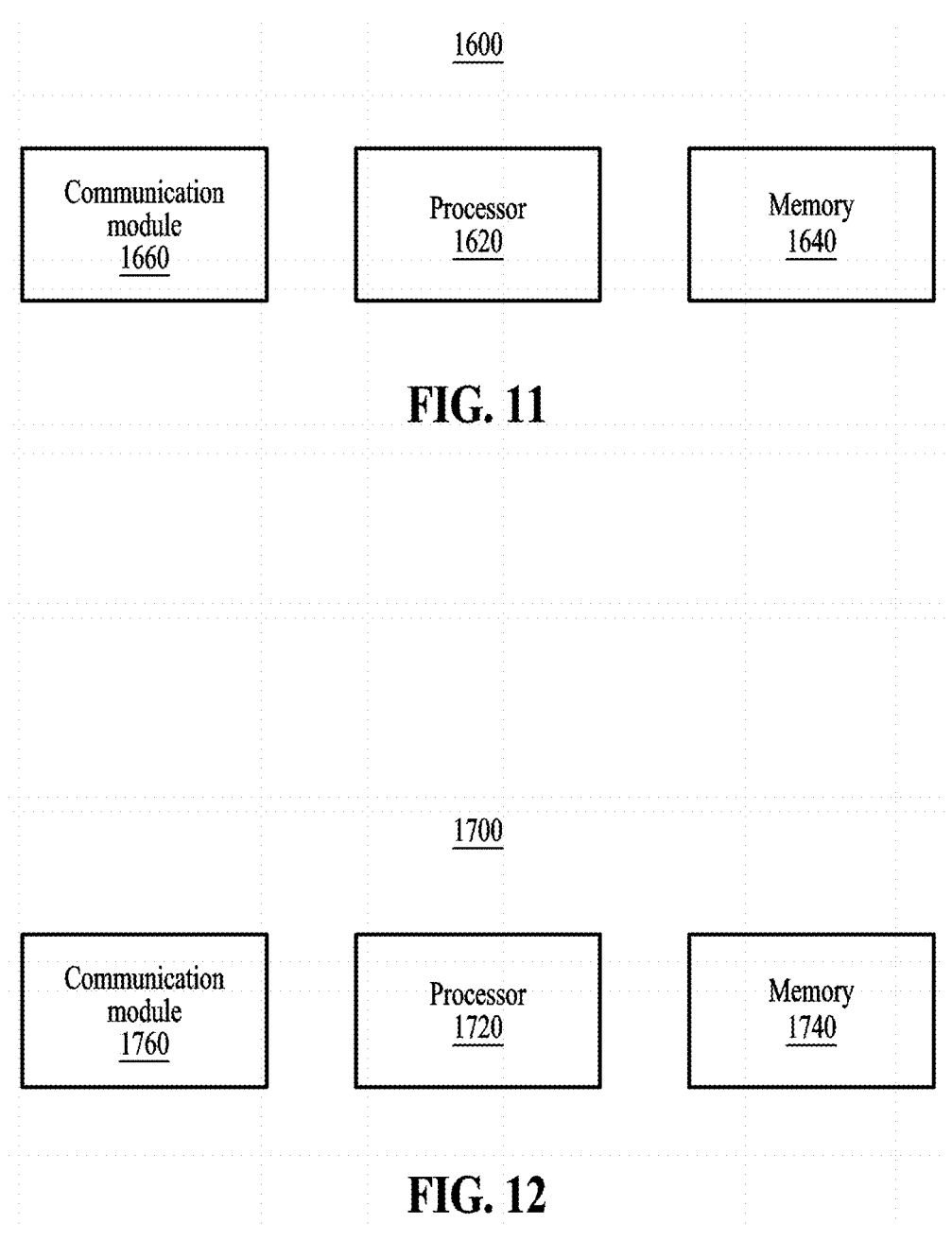
FIG. 11 is a schematic block diagram illustrating a delivery robot according to an example embodiment.
FIG. 12 is a schematic block diagram illustrating a delivery robot service provider according to an example embodiment.

FIG. 11 is a schematic block diagram illustrating a delivery robot according to an example embodiment.

Referring to FIG. 11, according to an example embodiment, a delivery robot 1600 (e.g., the delivery robot 11 in FIGS. 1 to 10) may include a processor 1620, a memory 1640, and a communication module 1660.

The memory 1640 may store instructions (or programs) executable by the processor 1620. The instructions may include, for example, instructions for executing operations of the processor 1620 and/or instructions for executing operations of each component of the processor 1620.

The memory 1640 may include one or more computer-readable storage media. The memory 1640 may include non-volatile storage devices, such as, for example, a magnetic hard disc, an optical disc, a floppy disc, a flash memory, an erasable programmable read-only memory (EPROM), and an electrically erasable programmable read-only memory (EEPROM).

The memory 1640 may be non-transitory media. The term "non-transitory" may indicate that a storage medium is not implemented by a carrier or propagated signal. However, the term "non-transitory" should not be construed that the memory 1640 is immovable.

The processor 1620 may process data stored in the memory 1640. The processor 1620 may execute computer-readable code (e.g., software) stored in the memory 1640 and instructions caused by the processor 1620.

The processor 1620 may be a hardware-implemented data processing device having a physically structured circuit for executing desired operations. The desired operations may include, for example, code or instructions included in a program.

The hardware-implemented data processing device may include, for example, a microprocessor, a central processing unit (CPU), a processor core, a multi-core processor, a multiprocessor, an application-specific integrated circuit (ASIC), or a field-programmable gate array (FPGA).

The processor 1620 may cause the delivery robot 1600 to perform one or more operations by executing code, instructions, and/or applications stored in the memory 1640. The operations performed by the delivery robot 1600 may be substantially the same as the ones performed by the delivery robot 11 described above with reference to FIGS. 1 through 10, and repeated descriptions thereof are hereby omitted.

The communication module 1660 may establish a communication channel (e.g., a wireless communication channel) for communications. The communication module 1660 may support performing communications over the established communication channel. The communication module 1660 may include one or more communication processors supporting direct (e.g., wired) or wireless communication. The communication module 1660 may include a wireless communication module (e.g., a cellular communication module, a short-range wireless communication module, or a global navigation satellite system (GNSS) communication module) or a wired communication module (e.g., a local area network (LAN) communication module or a power line communication module).

FIG. 12 is a schematic block diagram illustrating a delivery robot service provider according to an example embodiment.

Referring to FIG. 12, according to an example embodiment, a delivery robot service provider 1700 (e.g., the delivery robot service provider 17 in FIGS. 1 to 10) may include a processor 1720, a memory 1740, and a communication module 1760.

The memory 1740 may store instructions (or programs) executable by the processor 1720. The instructions may include, for example, instructions for executing operations of the processor 1720 and/or instructions for executing operations of each component of the processor 1720.

The memory 1740 may include one or more computer-readable storage media. The memory 1740 may include non-volatile storage devices, such as, for example, a magnetic hard disc, an optical disc, a floppy disc, a flash memory, an EPROM, and an EEPROM.

The memory 1740 may be non-transitory media. The term "non-transitory" may indicate that a storage medium is not implemented by a carrier or propagated signal. However, the term "non-transitory" should not be construed that the memory 1740 is immovable.

The processor 1720 may process data stored in the memory 1740. The processor 1720 may execute computer-readable code (e.g., software) stored in the memory 1740 and instructions caused by the processor 1720.

The processor 1720 may be a hardware-implemented data processing device having a physically structured circuit for executing desired operations. The desired operations may include, for example, code or instructions included in a program.

The hardware-implemented data processing device may include, for example, a microprocessor, a CPU, a processor core, a multi-core processor, a multiprocessor, an ASIC, or an FPGA.

The processor 1720 may cause the delivery robot service provider 1700 to perform one or more operations by executing code, instructions, and/or applications stored in the memory 1740. The operations performed by the delivery robot service provider 1700 may be substantially the same as the ones performed by the delivery robot service provider 17 described above with reference to FIGS. 1 through 10, and repeated descriptions thereof are hereby omitted.

The communication module 1760 may establish a communication channel (e.g., a wireless communication channel) for communications. The communication module 1760 may support performing communications over the established communication channel. The communication module 1760 may include one or more communication processors supporting direct (e.g., wired) or wireless communications. The communication module 1760 may include a wireless communication module (e.g., a cellular communication module, a short-range wireless communication module, or a GNSS communication module) or a wired communication module (e.g., a LAN communication module or a power line communication module).

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Although the present disclosure has been illustrated and described with reference to various embodiments, it is to be understood by those skilled in the art that the various embodiments are intended to be provided as examples and not limiting the disclosure. It is to be understood by those skilled in the art that various changes in form and detail, including the appended claims and equivalents thereof, may be made without departing from the true spirit and full scope of this disclosure. It is also to be understood by those skilled in the art that any of the embodiments described herein may be used in conjunction with other embodiments described herein.

Therefore, in addition to the above disclosure, the scope of the disclosure may also be defined by the claims and their equivalents, and all variations within the scope of the claims and their equivalents are to be construed as being included in the disclosure.

What is claimed is:

1. A method of operating a delivery robot service provider that manages a delivery robot, the method comprising:
   generating delivery information in response to a delivery request from a user;
   assigning a delivery robot that is to perform the delivery request;
   transmitting the delivery information to the delivery robot;
   checking whether the delivery robot arrives at a transportation infrastructure located on a delivery route based on delivery status information transmitted from the delivery robot;
   transmitting signal request information associated with the transportation infrastructure to a traffic information service provider that manages the transportation infrastructure to allow the delivery robot to use the transportation infrastructure;
   receiving, from the traffic information service provider, signal status information associated with the transportation infrastructure, wherein the signal status information is generated according to the signal request information; and
   transmitting, to the delivery robot, the signal status information to allow the delivery robot to cross a road using the transportation infrastructure.

2. The method of claim 1, wherein the delivery information comprises:
   information about the transportation infrastructure that needs to be interworked with the delivery robot.

3. The method of claim 1, wherein the delivery status information comprises:
   information to notify the delivery robot service provider that the delivery robot is waiting to use the transportation infrastructure.

4. The method of claim 1, further comprising:
   determining whether a signal change in the transportation infrastructure is required, based on the signal status information;

in response to a determination that the signal change is required, generating signal change request information for the signal change in the transportation infrastructure; and transmitting the signal change request information to the traffic information management system.

5. A delivery robot service providing device configured to manage a delivery robot, the delivery robot service providing device comprising:

a processor; and a memory storing instructions, wherein, when executed by the processor, the instructions cause the delivery robot to perform a plurality of operations, wherein the plurality of operations comprises:

generating delivery information in response to a delivery request from a user;

assigning a delivery robot that is to perform the delivery request;

transmitting the delivery information to the delivery robot;

checking whether the delivery robot arrives at a transportation infrastructure located on a delivery route based on delivery status information transmitted from the delivery robot;

transmitting signal request information associated with the transportation infrastructure to a traffic information service provider that manages the transportation infrastructure to allow the delivery robot to use the transportation infrastructure;

receiving, from the traffic information service provider, signal status information associated with the transportation infrastructure, wherein the signal status information is generated according to the signal request information; and transmitting, to the delivery robot, the signal status information to allow the delivery robot to cross a road using the transportation infrastructure.

6. The delivery robot service providing device of claim 5, wherein the delivery information comprises:

information about the transportation infrastructure that needs to be interworked with the delivery robot.

7. The delivery robot service providing device of claim 5, wherein the delivery status information comprises:

information to notify the delivery robot service provider that the delivery robot is waiting to use the transportation infrastructure.

8. The delivery robot service providing device of claim 5, wherein the plurality of operations further comprises:

determining whether a signal change in the transportation infrastructure is required, based on the signal status information;

in response to a determination that the signal change is required, generating signal change request information for the signal change in the transportation infrastructure; and transmitting the signal change request information to the traffic information management system.

9. A method of operating a delivery robot, the method comprising:

receiving delivery information in response to a delivery request from a user;

traveling along a delivery route based on the delivery information;

upon arriving at a transportation infrastructure on the delivery route, generating delivery status information to use the transportation infrastructure;

transmitting the delivery status information to a delivery robot service provider to notify the delivery robot service provider that the delivery robot is waiting to use the transportation infrastructure, wherein the delivery robot service provider is configured to transmit signal request information associated with the transportation infrastructure to a traffic information service provider that manages the transportation infrastructure based on the delivery status information, to allow the delivery robot to use the transportation infrastructure;

receiving, from the delivery robot service provider, signal status information associated with the transportation infrastructure generated according to the signal request information; and crossing a road using the transportation infrastructure based on the signal status information.

10. The method of claim 9, wherein the delivery information comprises:

information about the transportation infrastructure that needs to be interworked with the delivery robot.

* * * * *